Figure 3:
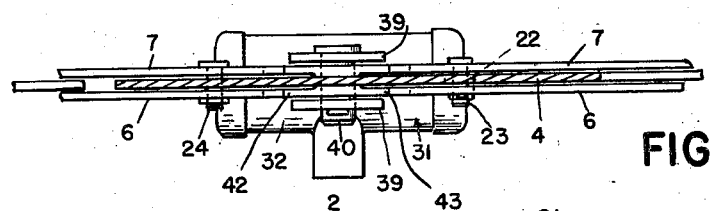

Sept. 3, 1946.  J. A. FORBES  2,406,754
BRAKE
Filed July 26, 1943  4 Sheets-Sheet 1

INVENTOR.
JOSEPH A. FORBES
BY
Whittemore Hulbert & Belknap
ATTORNEYS

Sept. 3, 1946.    J. A. FORBES    2,406,754
BRAKE
Filed July 26, 1943    4 Sheets-Sheet 2

INVENTOR.
JOSEPH A. FORBES
BY
Whittemore Hulbert & Belknap
ATTORNEYS

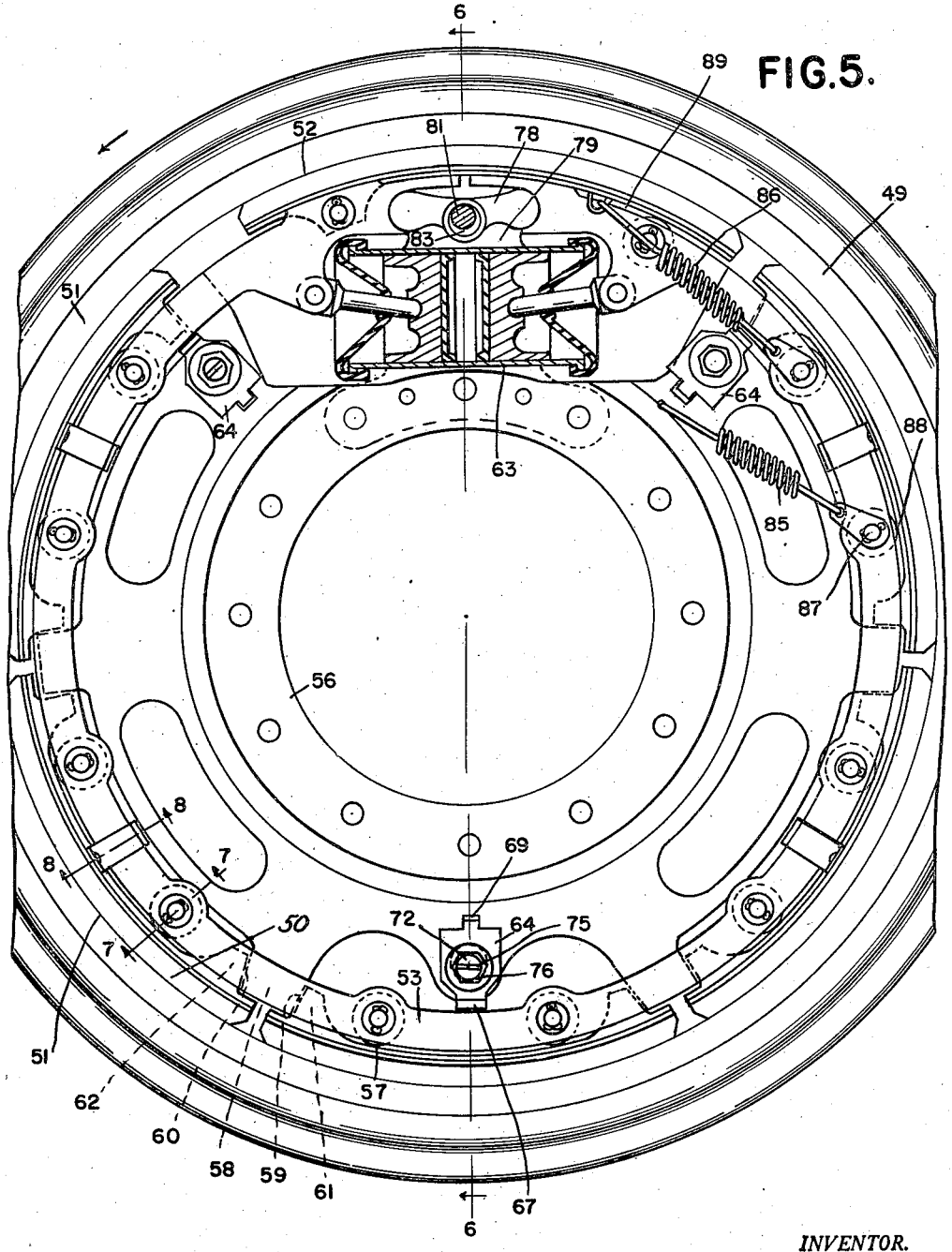

Sept. 3, 1946.　　J. A. FORBES　　2,406,754
BRAKE
Filed July 26, 1943　　4 Sheets-Sheet 4
FIG.6.
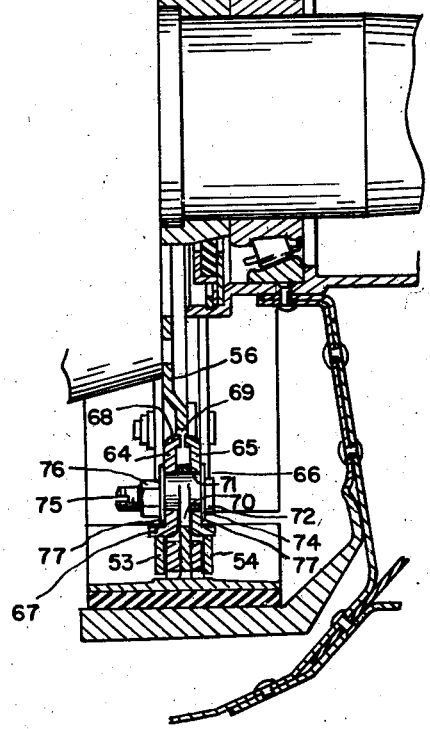
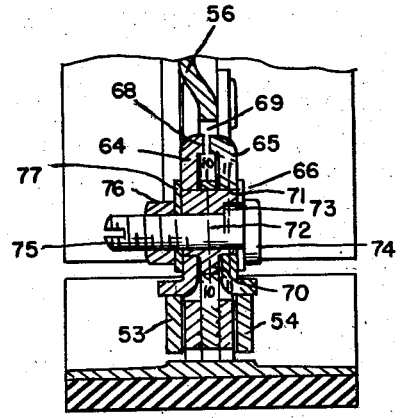
FIG.9.
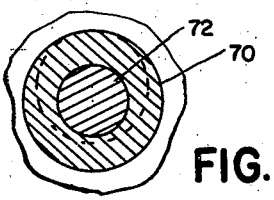
FIG.10.
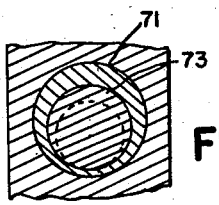
FIG.11.
INVENTOR.
JOSEPH A. FORBES
BY
*Whittemore Hulbert + Belknap*
ATTORNEYS Patented Sept. 3, 1946

2,406,754

UNITED STATES PATENT OFFICE 2,406,754

BRAKE

Joseph A. Forbes, Detroit, Mich., assignor to Kelsey-Hayes Wheel Company, Detroit, Mich., a corporation of Delaware Application July 26, 1943, Serial No. 496,192

6 Claims. (Cl. 188—78)

The invention relates to brakes and refers more particularly to brakes of that type having a brake drum and brake members engageable with the drum.

The invention has for one of its objects to provide an improved and powerful brake.

The invention has for another object to provide a brake which is so constructed that its operation is controlled by utilizing the torque of some of the brake members to increase the braking pressure and by anchoring the remaining brake members so that their torque is not utilized.

The invention has for further objects to provide simple means for securing the brake members to the expansible thrust device for actuating the brake members; and to provide simple means for positioning the expansible thrust device relative to the drum.

With these as well as other objects in view, the invention resides in the novel features of construction and combinations and arrangements of parts as more fully hereinafter set forth.

Figure 1:
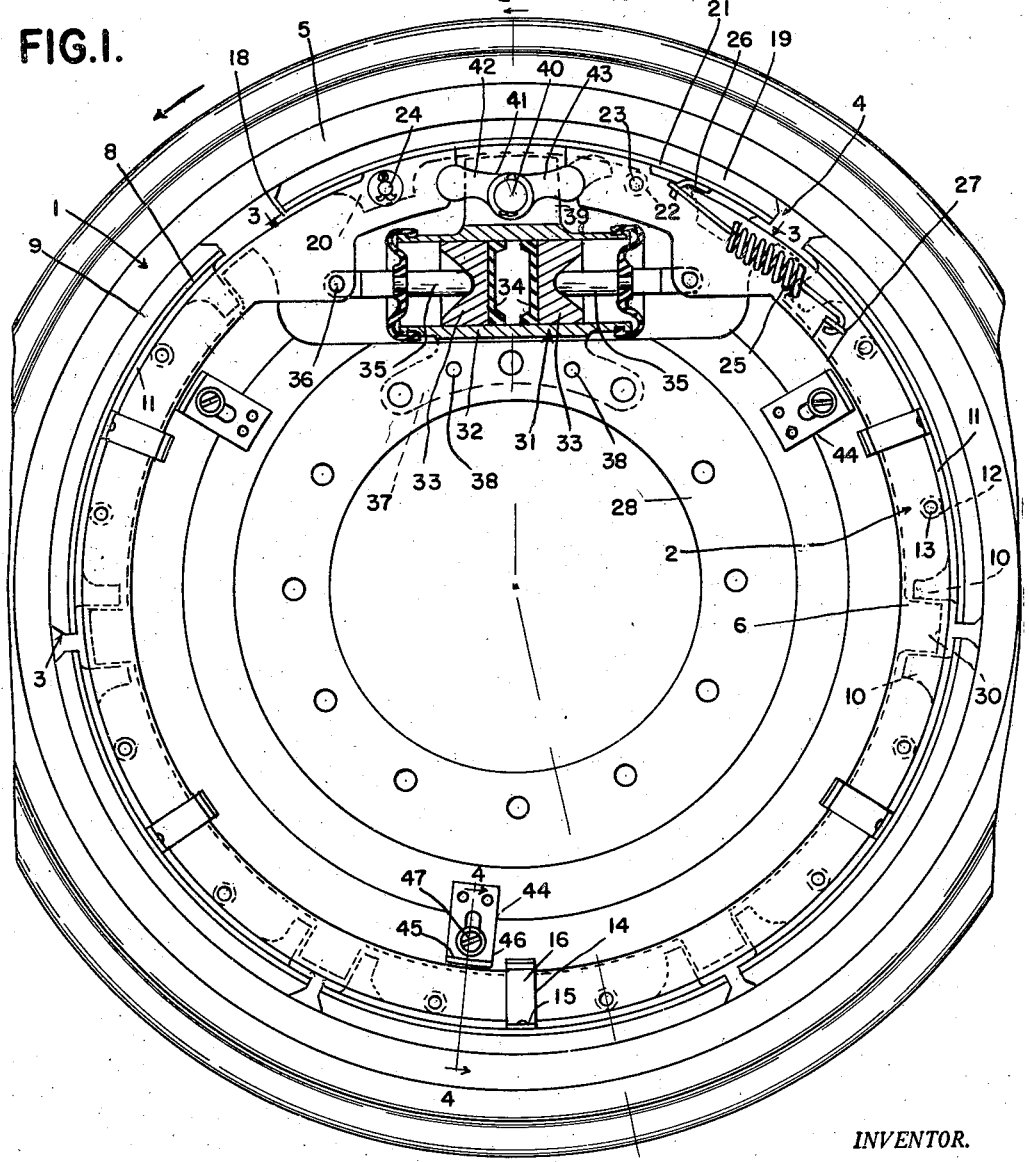
Figure 2:
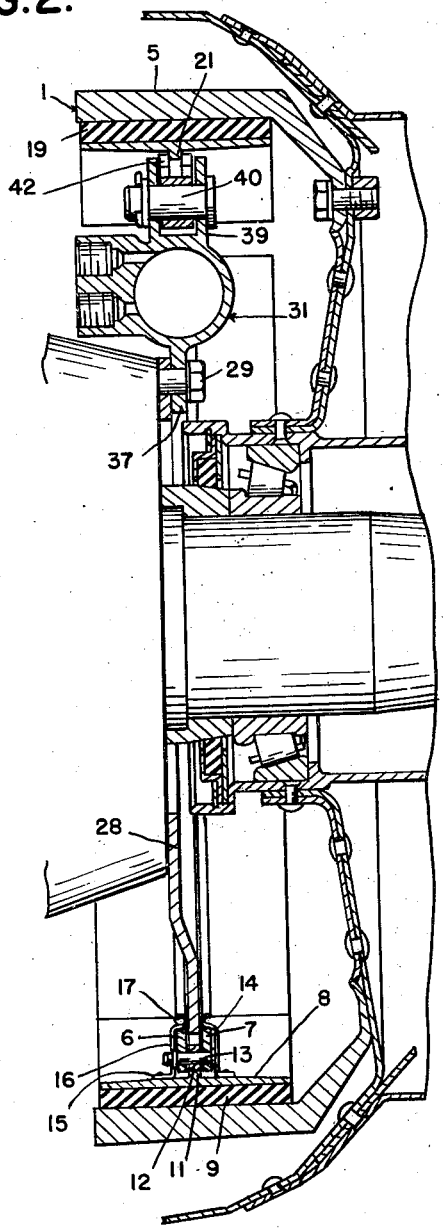
Figure 4:
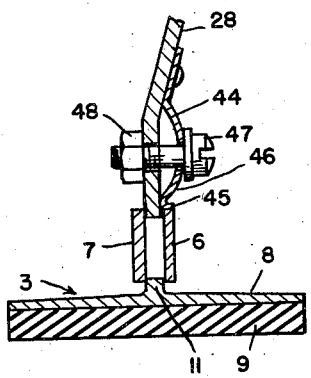
Figure 7:
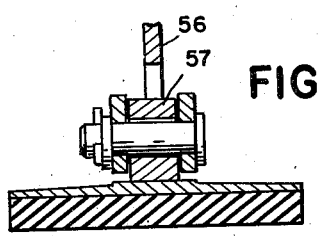
Figure 8:
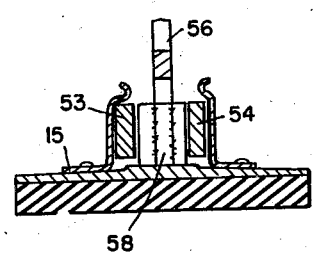

In the drawings:

Figure 1 is an elevation, with parts broken away and in section, of a brake embodying the invention;

Figures 2, 3 and 4 are cross sections on the lines 2—2, 3—3 and 4—4, respectively, of Figure 1;

Figure 5 is a view similar to Figure 1 of a modified brake;

Figures 6, 7 and 8 are cross sections on the lines 6—6, 7—7 and 8—8, respectively, of Figure 5;

Figure 9 is an enlarged view of a portion of Figure 6;

Figures 10 and 11 are cross sections on the lines 10—10 and 11—11, respectively, of Figure 9.

The brake, illustrated in Figures 1 to 4, inclusive, comprises the brake drum 1 adapted to be secured to a wheel of an airplane, motor vehicle, or the like, the expansible thrust device 2 and the internal brake members 3 and 4 adapted to be moved against the annular brake flange 5 of the drum by the expansible thrust device.

The expansible thrust device is formed of the two transversely split resilient rings 6 and 7 spaced from and extending substantially parallel to and coextensive with each other. The brake members 3 and 4 encircle the rings and are arranged in end to end relation and engageable with the same zone of the brake flange. As shown in the present instance, there are a plurality of like brake members 3 and but one brake member 4, the latter bridging the ends of the rings.

Each brake member 3 is mounted on the rings 6 and 7 to move circumferentially thereof to a limited extent. As shown, each brake member 3 is formed of the arcuate body 8 and the brake lining 9, the body being of T-section and having an axial flange to which the lining is secured and a web which extends between the rings. The web has the end portions 10 and the reduced intermediate portion 11. The latter engages the pair of angularly spaced rolls 12 which are located between the rings and are journaled on the pins 13 extending through the rings. 14 are spring clips for securing the body 8 to the rings. These spring clips have the transverse flanges 15 fixedly secured by suitable means, such as rivets, to the axial flange of the body substantially midway of its ends and also have the generally radial portions 16 extending generally radially inwardly along the opposite sides of the rings and further have the transverse flanges 17 extending axially inwardly toward each other and over the radially inner edges of the rings.

The brake member 4 has the arcuate body 18 and the brake lining 19, the body being of T-section and having an axial flange to which the lining is secured and a web which extends between the rings 6 and 7. The web has the end portion 20 and the reduced portion 21, the latter engaging the roll 22 journaled upon the pin 23 which extends through the rings 6 and 7 at corresponding ends thereof. The end portion 20 is operatively connected to the other ends of the rings by means of the pin 24 which extends through the rings 6 and 7 and the end portion 20. 25 is a coil spring hooked at one end to the bracket 26 upon the body 18 near the roll 22 and hooked at the other end to the bracket 27 secured to the ring 6.

28 is a carrier plate secured by suitable means, such as the bolts 29, to the fixed flange of the support upon which the wheel is journaled in concentric relation to the drum 1. The carrier plate is provided with the angularly spaced generally radially outwardly extending projections 30 which extend between the rings 6 and 7 and are located at the ends of the end portions 10 of the webs of the brake members 3 to limit the circumferential movement of the brake members. The end edges of the projections 30 and the end portions 10, as shown, extend parallel to the radial lines passing through the middles of the projections.

The carrier plate has fixedly secured thereto the fluid pressure actuator or wheel cylinder 31 which comprises the cylinder 32, the pistons 33 slidable in the cylinder, the opposed sealing cups 34 engaging the pressure ends of the pistons, and the piston rods 35, which latter extend between and are pivotally connected by the pins 36 to the rings 6 and 7 near their ends. The cylinder 32 is formed with the integral radially inwardly extending projection 37 which is fixedly secured by suitable means, such as the rivets 38, to the carrier plate. The cylinder is additionally supported by certain of the bolts 29 which extend through the bracket 37. The cylinder 31 is also formed with the integral radially outwardly extending furcations 39 through which the pin 40 extends. This pin has journaled thereon the bell crank anchor 41 having the integral pairs of spaced arms 42 and 43 formed with convex ends engaging correspondingly shaped recesses in the ends of the rings 6 and 7.

To position the rings 6 and 7 in their retracted or normal position with respect to the brake flange 5 of the drum, I have provided the positioning plates 44 in angularly spaced relation to each other. Each of these plates is fixedly secured at its radially inner end by suitable means, such as rivets, to the carrier plate 28 and is provided at its radially outer end with the transverse flange 45 for abutting the radially inner edge of the ring 6. The intermediate portion 46 of the positioning plate is bowed and has extending therethrough the screw 47 on which is threaded the nut 48 abutting the side of the carrier plate opposite the positioning plate. The positioning plates are resilient so that by turning the nuts the bowed portions of the positioning plates may be flattened to move the adjacent portions of the ring radially outwardly, or the bowed portions may be allowed to become more convex to allow the adjacent portions of the ring to move radially inwardly by reason of the inherent resiliency of the ring, the other ring being correspondingly movable.

Assuming the drum 1 to be rotating in the direction of the arrow in Figure 1, the pin 24 operatively connects the trailing end of the brake member 4 to the leading ends of the rings 6 and 7, the leading end of the brake member 4 being free from positive connection with the trailing ends of the rings 6 and 7. The coil spring 25 normally serves to hold the leading end of the brake member 4 in proper relation to the trailing ends of the rings 6 and 7 and also serves to hold the leading and trailing ends of the rings 6 and 7 against the bell crank anchor 41. It will be seen that when braking fluid under pressure is forced into the cylinder 32 the pistons 33 are relatively moved away from each other to relatively move the leading and trailing ends of the rings 6 and 7 away from each other and expand these rings. As soon as the brake members 3 and 4 move against the brake flange 5 of the drum, the trailing ends of the rings 6 and 7 engage the bell crank anchor 41 so that any continued relative movement of the leading and trailing ends takes place with the leading ends only. When the brake members 3 engage the annular brake flange they move circumferentially to a limited extent, as determined by the leading end portions 10 abutting the projections 30 of the carrier plate. When the brake member 4 moves into engagement with the annular brake flange its torque is transmitted through the pin 24 to the leading ends of the rings 6 and 7 to increase the expanding pressure upon the rings and to thereby increase the pressure of these rings upon the brake members urging the same against the brake flange. The construction is such that the amount of torque carried over or across the gap between the leading and trailing ends of the expansible thrust device or the rings to increase the expanding force exerted on the device or the rings may be readily controlled by varying the area of the brake member bridging the ends and by varying the number of brake members whose torque is to be thus used. When the pressure of the braking fluid is released the parts will be returned to their retracted or normal positions by the inherent resiliency in the rings 6 and 7 and the coil spring 25.

The brake illustrated in Figures 5 to 11, inclusive, comprises the brake drum 49, the expansible thrust device 50 and the internal brake members 51 and 52 adapted to be moved against the brake flange of the drum by the expansible thrust device. The construction of the drum, device and brake members is quite similar to that of the drum, device and brake members of Figures 1 to 4, inclusive. However, the transversely split resilient rings 53 and 54 forming the device are spaced apart a greater distance and the web of the arcuate bodies of the brake members has a base portion providing an extended bearing of greater width than the carrier plate 56 for engaging the rolls 57. Furthermore, the generally radially outwardly extending projections 58 of the carrier plate have their corresponding end edges 59 extending substantially radially and their end edges 60 substantially parallel to the end edges 59 so that with the drum rotating in the direction of the arrow, shown in Figure 5, the end edges 60 will facilitate generally radially outward movement of the brake members 51 when forced against the brake flange of the drum by the rings. The trailing end projections 61 and the leading end projections 62 of the brake members 51 have their end edges engageable with the end edges 59 and 60 substantially parallel thereto to provide an extended bearing.

The construction of the fluid pressure operated actuator or wheel cylinder 63 and its mounting on the carrier plate 56 is substantially the same as in Figures 1 to 4, inclusive.

The rings 53 and 54 in their retracted or normal position are adjustably positioned on the carrier plate 56 by means of the pairs of angularly spaced positioning plates 64 and 65 and the eccentrics 66. The positioning plates 64 and 65 extend generally radially at opposite sides of the carrier plate 56 and have at their radially outer ends the flanges 67 extending away from each other and engaging the radially inner edges of the rings 53 and 54. The plates have at their radially inner ends the flanges 68 which extend toward each other and into the radially extending slot 69 formed in the carrier plate. The eccentric 66 is formed with the central cylindrical portion 70 which is journaled in the carrier plate radially outwardly of the slot 69. The eccentric also has at opposite sides of the central portion the eccentric end portions 71 which are journaled in the plates 64 and 65. 72 is a pin extending through the eccentric 66 and having its axis concentric with the cylindrical portion 70. This pin is, in effect, keyed to the eccentric by having the eccentric portion 73 fitting in the corresponding eccentric recess in the eccentric. The pin is provided at one end with the head 74 and at the other end with the diametral slot 75 for receiving a suitable tool, such as a screw driver, to rotate the pin and thereby rotate the eccentric. 76 is a nut threaded upon the slotted end of the pin and adapted upon being tightened to clamp the pin and eccentric in a position of rotative adjustment.

spring washers 77 being preferably provided between the nut and the plate 64 and the head and the plate 65.

The bell crank anchor 78 between the ends of the rings is adjustably pivotally mounted on the furcations 79 of the cylinder of the fluid pressure operated actuator or wheel cylinder 63. In detail, 80 is an eccentric which has the axially aligned shank 81 and head 82 journaled in the furcations and the intermediate eccentric portion 83 on which the bell crank anchor is journaled. The shank 81 has at its end a diametral slot for receiving a suitable tool, such as a screw driver, to rotatively adjust the eccentric. 84 is a nut threaded on the shank for clamping the eccentric portion against the furcation located between the eccentric portion and the nut.

For retracting the rings and the brake members I have provided the coil springs 85 and 86. The spring 85 is connected at its upper end to the carrier plate 56 and at its lower end to the pin 87 on which is mounted the roll 88 engageable with the lower end portion of the upper right brake member 51. The spring 86 is connected at its upper end to the bracket 89 upon the trailing end portion of the brake member 52 and at its lower end to a pin on which is mounted a roll engageable with the upper end portion of the upper right brake member 51. The arrangement of springs is such that the spring 85 serves to resiliently hold the trailing ends of the rings against the bell crank anchor 78 and the spring 86 serves to resiliently hold the trailing end portion of the brake member 52 upon its roll and the leading ends of the rings against the bell crank anchor 78.

What I claim as my invention is:

1. A brake comprising a brake drum, an expansible device having separable normally leading and trailing ends, internal brake members movable relative to said device and also movable by said device against said drum, an internal brake member other than said first mentioned members bridging said ends, said bridging member being movable by said device against said drum and being operatively connected to said device at said normally leading end to transmit its torque when against said drum to said device at said normally leading end, and anchor means for said device and certain of said first mentioned members.

2. A brake comprising a brake drum, a carrier plate, expansible ring means on said plate having separable ends, anchor means on said plate for said ring means, brake members movable relative to said ring means and also movable against said drum by said ring means, a brake member other than said first mentioned members bridging said ends and movable against said drum by said ring means, anchor means on said plate for certain of said first mentioned members, means for relatively moving said ends away from each other to expand said ring means, and means for converting the torque of said bridging member when against said drum into an expanding force for said ring means.

3. A brake comprising a brake drum, an expansible device, brake members encircling said device and movable thereby against said drum, and means for securing said members to said device comprising a spring clip secured to one of said members and having a transverse portion extending over and resiliently engaging said device.

4. A brake comprising a brake drum, substantially parallel transversely split rings, brake members encircling said rings and movable thereby against said drum, and means for securing said members to said rings comprising spring clips secured to one of said members and having portions extending toward each other transversely of and over said rings.

5. A brake comprising a brake drum normally rotatable in one direction, a carrier plate, expansible ring means having separable leading and trailing ends, anchor means on said plate between and engageable with said ends, brake members movable against said drum by said ring means, one of said members bridging said ends and having its trailing end operatively connected to said ring means at the leading end thereof, anchor means on said plate for certain other of said members, means on said plate for relatively moving said ends away from each other to expand said ring means, and a spring connected at one end to the trailing end portion of said bridging member and at the other end to said ring means near the trailing end thereof, said spring means serving to resiliently hold the trailing end portion of said bridging member radially inwardly against said ring means and to resiliently hold said ends of said ring means against said first mentioned anchor means.

6. A brake comprising a brake drum normally rotatable in one direction, a carrier plate, expansible ring means having separable leading and trailing ends, anchor means on said plate between and engageable with said ends, brake members movable against said drum by said ring means, one of said members bridging said ends and having its trailing end operatively connected to said ring means at the leading end thereof, anchor means on said plate for certain other of said members, means on said plate for relatively moving said ends away from each other to expand said ring means, a spring connected to said bridging member at the trailing end portion thereof and also to said ring means for resiliently holding the trailing end portion of said bridging member against said ring means and the leading end of said ring means against said first mentioned anchor means, and a second spring connected to said carrier plate and ring means for resiliently holding the trailing end of said ring means against said first mentioned anchor means.

JOSEPH A. FORBES.